(12) United States Patent
Park

(10) Patent No.: US 7,936,417 B2
(45) Date of Patent: May 3, 2011

(54) FLAT PANEL DISPLAY (FPD) AND METHOD OF FABRICATION

(75) Inventor: Yoon-Chul Park, Suwon-si (KR)

(73) Assignee: Samsung Mobile Display Co., Ltd., Giheung-Gu, Yongin, Gyunggi-Do (KR)

( * ) Notice: Subject to any disclaimer, the term of this patent is extended or adjusted under 35 U.S.C. 154(b) by 1395 days.

(21) Appl. No.: 11/280,303

(22) Filed: Nov. 17, 2005

(65) Prior Publication Data

US 2006/0109410 A1     May 25, 2006

(30) Foreign Application Priority Data

Nov. 24, 2004  (KR) .................. 10-2004-0097175

(51) Int. Cl.
*G02F 1/1333*  (2006.01)
(52) U.S. Cl. ............................. 349/59; 349/58
(58) Field of Classification Search ............... 349/58–59
See application file for complete search history.

(56) References Cited

U.S. PATENT DOCUMENTS

| 6,040,037 | A  | * | 3/2000 | Imai ................... 428/209 |
| 2003/0174265 | A1 |   | 9/2003 | Sugawara |
| 2004/0227890 | A1 | * | 11/2004 | Chung et al. ................ 349/141 |
| 2004/0238827 | A1 | * | 12/2004 | Takayama et al. ........... 257/79 |
| 2005/0105009 | A1 | * | 5/2005 | Dunn et al. ................... 349/21 |

FOREIGN PATENT DOCUMENTS

| CN | 1487347 | 4/2004 |
| CN | 1514270 | 7/2004 |
| JP | S59-4583 | 1/1984 |
| JP | S63-037317 | 2/1988 |
| JP | H5-25427 | 4/1993 |
| JP | 08-069007 | 3/1996 |
| JP | 2000-347208 | 12/2000 |
| JP | 2001-230001 | 8/2001 |
| JP | 2001-318613 | 11/2001 |
| JP | 2002-023183 | 1/2002 |
| KR | 1998-0014194 | 5/1998 |
| KR | 1998-077397 | 11/1998 |
| KR | 10-0206565 | 4/1999 |
| KR | 2005-0023867 | 3/2005 |

OTHER PUBLICATIONS

Japanese Office Action Issued on Jun. 3, 2008 for corresponding Japanese Patent Application No. 2005-232453.
Korean Office Action for Korean Patent Application No. 2004-0097175 issued on May 22, 2006.
Office action from the Japanese Patent Office issued in the Applicant's corresponding Japanese Patent Application No. 2005-232453 dated Mar. 10, 2009.

* cited by examiner

*Primary Examiner* — David Nelms
*Assistant Examiner* — Nathanael R Briggs
(74) *Attorney, Agent, or Firm* — Robert E. Bushnell, Esq.

(57) ABSTRACT

A Flat Panel Display (FDP) includes: a display device arranged on a substrate; an encapsulation substrate adapted to encapsulate the display device; a conductive layer arranged on an outside surface of the encapsulation substrate; an anisotropic conductive material arranged on the conductive layer; and a bezel arranged in contact with the anisotropic conductive material. A method of fabricating an FDP includes: forming a display device on a substrate; encapsulating the substrate with an encapsulation substrate; forming a conductive layer on an outside surface of the encapsulation substrate; forming an anisotropic conductive material on the conductive layer; and mounting the substrate on a bezel such that the bezel contacts the anisotropic conductive material.

16 Claims, 3 Drawing Sheets

FLAT PANEL DISPLAY (FPD) AND METHOD OF FABRICATION

CLAIM OF PRIORITY

This application makes reference to, incorporates the same herein, and claims all benefits accruing under 35 U.S.C. §119 from an application for FLAT PANEL DISPLAY AND FABRICATING METHOD OF THE SAME earlier filed in the Korean Intellectual Property Office on 24 Nov. 2004 and there duly assigned Serial No. 10-2004-0097175.

BACKGROUND OF THE INVENTION

1. Field of the Invention

The present invention relates to a Flat Panel Display (FPD) and method of fabrication and, more particularly, to an FPD having a structure capable of preventing static electricity, and to a method of fabrication.

2. Description of the Related Art

A display, which is an interface between a variety of electronic devices and a person, converts electrical signals output from electronic devices to patterned information that the person can visually recognize and displays the information.

A Cathode Ray Tube (CRT) is a typical display, but more attention has recently been paid to Flat Panel Displays (FPDs), such as a Plasma Display Panel (PDP), a Liquid Crystal Display (LCD), and an Organic Light Emitting Display (OLED) because they are light-weight and ultra-thin, have low power consumption, and have High Definition (HD).

The LCD or OLED is typically used as a display for a small-sized electronic device and includes a display portion, an external circuit, and a bracket formed as a module.

In the small-sized electronic device, static electricity can adversely affect the display, i.e., the LCD or OLED. In the LCD, liquid crystals have an orientation controlled by an applied electric field and optical transmittance is controlled by the liquid crystal orientation to display an image. If static electricity affects the liquid crystals, the electric field is not properly applied, so that unit pixels of the LCD can be destroyed.

Above all, in an In-Plan-Switch (IPS)-mode LCD driven by a lateral electric field, once static electricity has been generated on the surface of the LCD, the lateral electric field is destroyed by the static electricity. Thus, liquid crystals in a portion where static electricity is generated react due to an electric field caused by the static electricity, thereby resulting in failures of pixels of the LCD.

To solve these problems, Korean Patent Registration No. 10-0325064, entitled "Method for Discharging Static Electricity in Liquid Crystal Display", teaches a conductive polymer network formed in a liquid crystal cell of an LCD. However, since this method includes a process of mixing liquid crystals with a polymer material and a process of curing the resultant mixture, the entire fabricating process becomes complicated, and the mixing process can have a bad influence on the liquid crystals.

SUMMARY OF THE INVENTION

The present invention, therefore, solves the aforementioned problems associated with conventional devices and methods by providing a Flat Panel Display (FPD) and method of fabrication, in which static electricity is prevented so that a display device in the FPD is protected.

Furthermore, a structure for preventing static electricity is disposed on the outside of an In-Plan-Switch (IPS)-mode liquid crystal display (LCD), to improve the display capability of the LCD.

In an exemplary embodiment of the present invention, a Flat Panel Display (FDP) includes: a display device arranged on a substrate; an encapsulation substrate adapted to encapsulate the display device; a conductive layer arranged on an outside surface of the encapsulation substrate; an anisotropic conductive material arranged on the conductive layer; and a bezel arranged in contact with the anisotropic conductive material.

The conductive layer preferably includes a transparent conductive layer.

The conductive layer preferably includes a material selected from a group consisting of Indium Tin Oxide (ITO), Indium Zinc Oxide (IZO), Indium Oxide (IO), Tin Oxide (TO), and Zinc Oxide (ZO).

The anisotropic conductive material is preferably arranged in a non-emission region.

The anisotropic conductive material preferably has a zebra structure.

The bezel preferably includes a conductive material.

The FPD preferably further includes a pad ground terminal arranged on the substrate.

The pad ground terminal is preferably adapted to be connected to a bezel.

The display device is preferably a Liquid Crystal Display (LCD).

The LCD is preferably an in-plan-switch (IPS)-mode LCD.

In another exemplary embodiment of the present invention, a method of fabricating a Flat Panel Display (FDP) includes: forming a display device on a substrate; encapsulating the substrate with an encapsulation substrate; forming a conductive layer on an outside surface of the encapsulation substrate; forming an anisotropic conductive material on the conductive layer; and mounting the substrate on a bezel such that the bezel contacts the anisotropic conductive material.

The conductive layer preferably includes a transparent conductive material.

The conductive layer preferably includes a material selected from a group consisting of Indium Tin Oxide (ITO), Indium Zinc Oxide (IZO), Indium Oxide (IO), Tin Oxide (TO), and Zinc Oxide (ZO).

The anisotropic conductive material is preferably formed in a non-emission region.

The anisotropic conductive material preferably includes a zebra structure.

The bezel preferably includes a conductive material.

The method preferably further includes forming a pad ground terminal on the substrate.

The pad ground terminal is preferably connected to the bezel.

The display device preferably includes a Liquid Crystal Display (LCD).

The LCD preferably includes an In-Plan-Switch (IPS)-mode LCD.

BRIEF DESCRIPTION OF THE DRAWINGS

A more complete appreciation of the present invention, and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
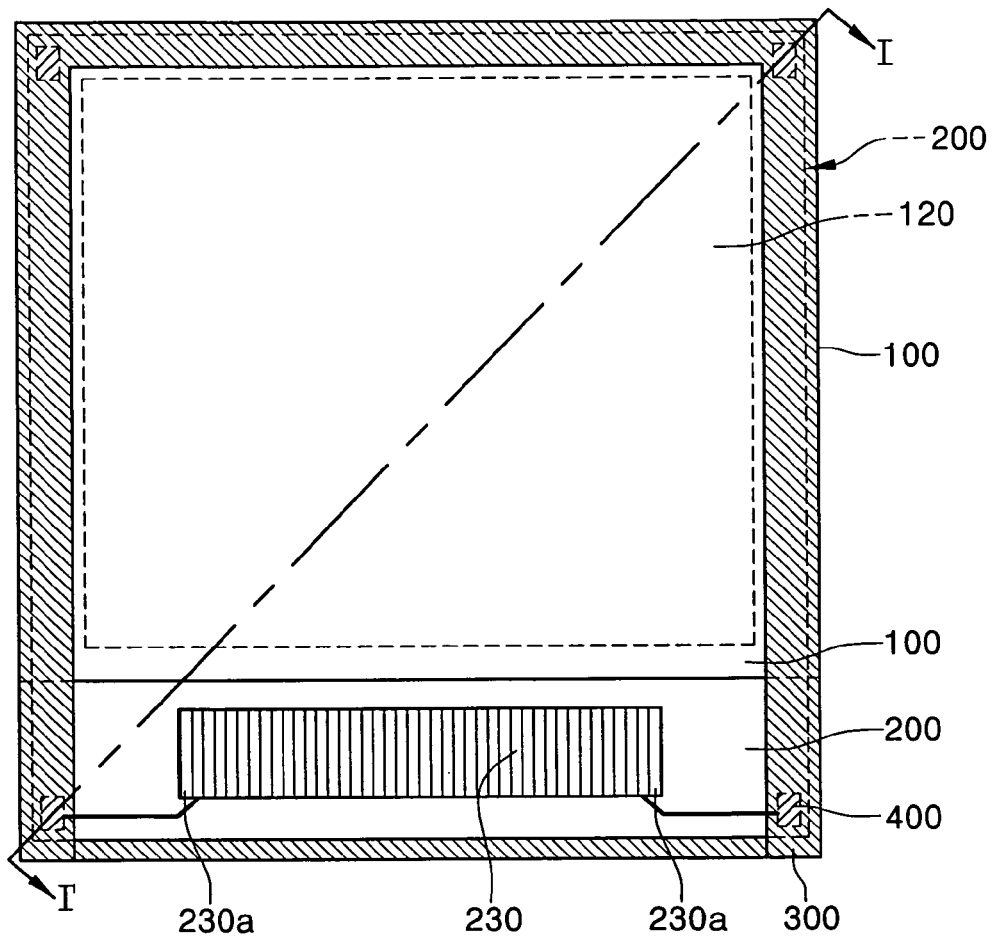
FIG. 1 is a plan view of a Flat Panel Display (FPD) according to an exemplary embodiment of the present invention.

The present invention will now be described more fully hereinafter with reference to the accompanying drawings, in which exemplary embodiments of the present invention are shown. This invention can, however, be embodied in different forms and should not be construed as being limited to the embodiments set forth herein. Rather, these embodiments are provided so that this disclosure is thorough and complete and fully conveys the scope of the present invention to those skilled in the art. The thicknesses of layers or regions shown in the drawings are exaggerated for clarity. The same reference numerals are used to denote the same elements throughout the specification.

Figure 2:
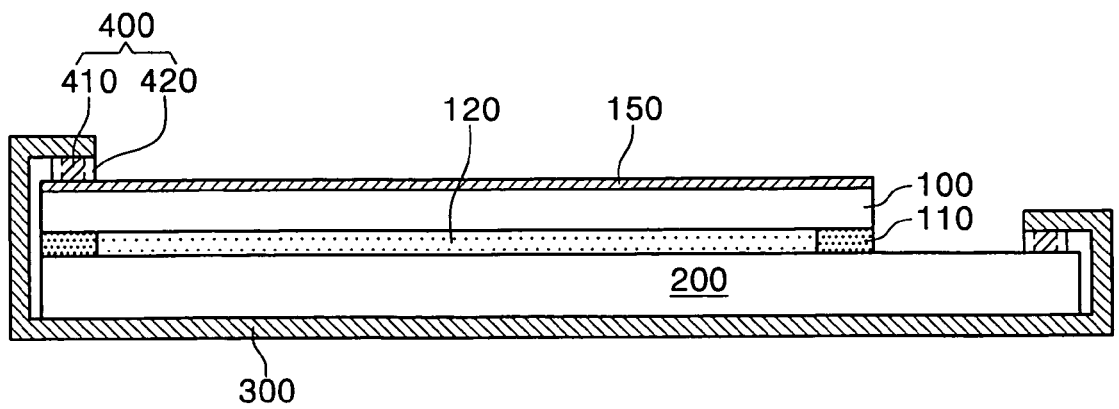
FIG. 2 is a cross-sectional view taken along line I-I' of FIG. 1.

FIG. 1 is a plan view of a Flat Panel Display (FPD) according to an exemplary embodiment of the present invention, and FIG. 2 is a cross-sectional view taken along line I-I' of FIG. 1. The FPD according to the exemplary embodiment of the present invention is described below with reference to FIGS. 1 and 2.

Referring to FIGS. 1 and 2, a display device 120 is disposed on a substrate 200. The display device 120 can be a Liquid Crystal Display (LCD), which can be an In-Plan-Switch (IPS)-mode LCD. On top of the substrate 200, an encapsulation substrate 100 is disposed to encapsulate the display device 120. The encapsulation substrate 100 can be a transparent substrate.

A conductive layer 150 is disposed on the outside of the encapsulation substrate 100. The conductive layer 150 can be a transparent conductive layer and formed of a material selected from the group consisting of Indium Tin Oxide (ITO), Indium Zinc Oxide (IZO), Indium Oxide (IO), Tin Oxide (TO), and Zinc Oxide (ZnO).

An anisotropic conductive material 400 is disposed on the conductive layer 150.

The anisotropic conductive material 400 can be disposed in a non-emission region in the vicinity of a region where the display device 120 is formed. Furthermore, one or more anisotropic conductive materials 400 can be disposed in the non-emission region. Also, the anisotropic conductive material 400 can be connected to a ground terminal 230a of a pad portion 230.

The anisotropic conductive material 400 can be a zebra structure comprised of a conductive material 410 and a non-conductive material 420.

The FPD including the anisotropic conductive material 400 is mounted on a bezel 300 that contacts the anisotropic conductive material 400. The bezel 300 can be formed of a conductive material. Also, a conductive layer can be patterned in a portion of the bezel 300, which contacts the anisotropic conductive material 400, and the patterned conductive layer can be connected externally.

Accordingly, static electricity generated in the FPD moves along the conductive layer 150 to the anisotropic conductive material 400. Then, the static electricity in the anisotropic conductive material 400 is externally grounded via the bezel 300. Thus, the static electricity generated in the FPD does not affect the display device 120 and leaves the FPD so that pixels of the display device 120 can be securely protected.

In addition, the ground terminal 230a of the pad portion 230 can be connected to the bezel 300 by the anisotropic conductive material 400. Thus, because the static electricity generated in the FPD does not affect circuits of the FPD and can be discharged from the FPD without using any external member such as a Flexible Printed Circuit (FPC), the display device 120 can be reliably protected from static electricity.

In particular, when the display device 120 includes IPS-mode liquid crystals, a failure in the arrangement of the liquid crystals due to external static electricity can be prevented.

Figure 3A:
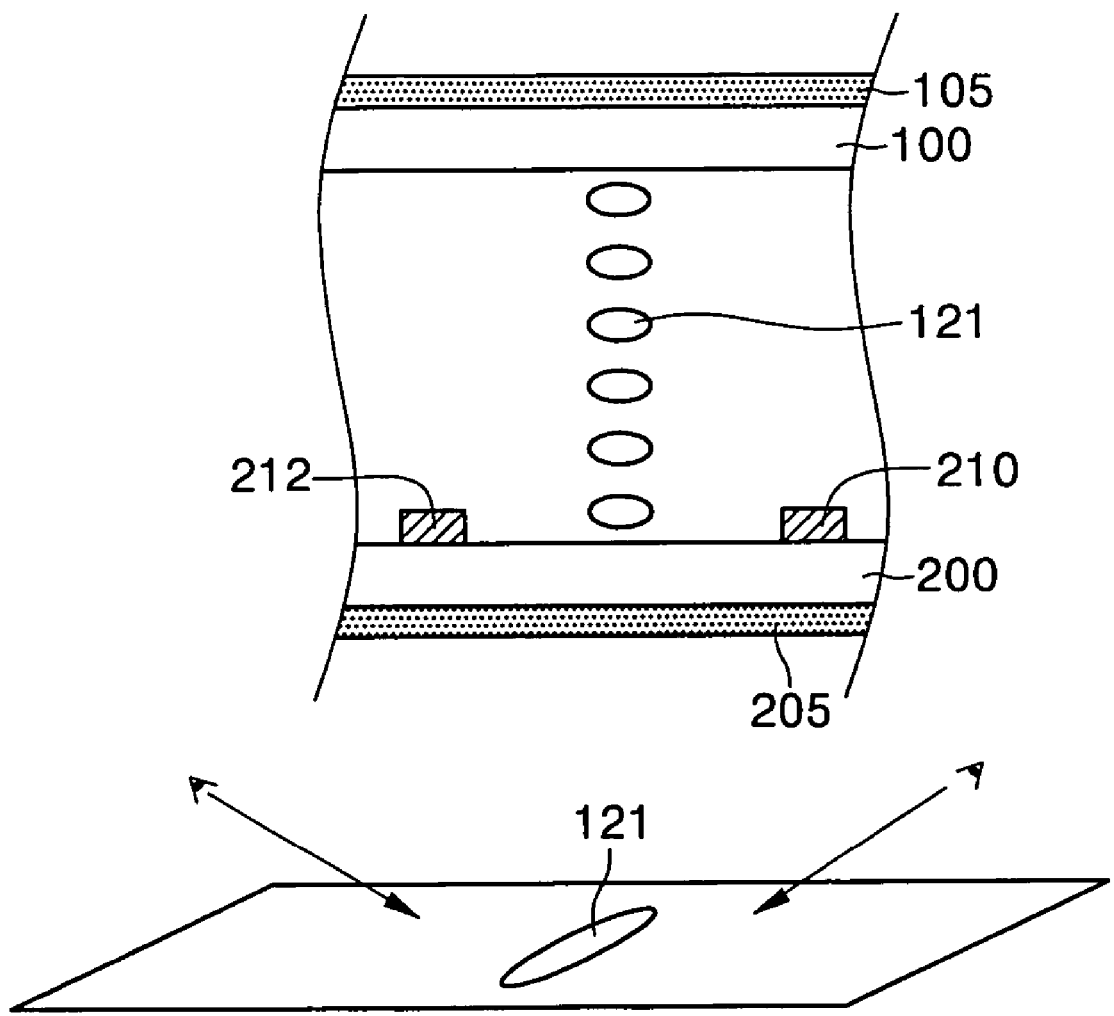
FIGS. 3A and 3B are cross-sectional views of the turned-on and turned-off states of an In-Plan-Switch (IPS)-mode Liquid Crystal Display (LCD).
Figure 3B:
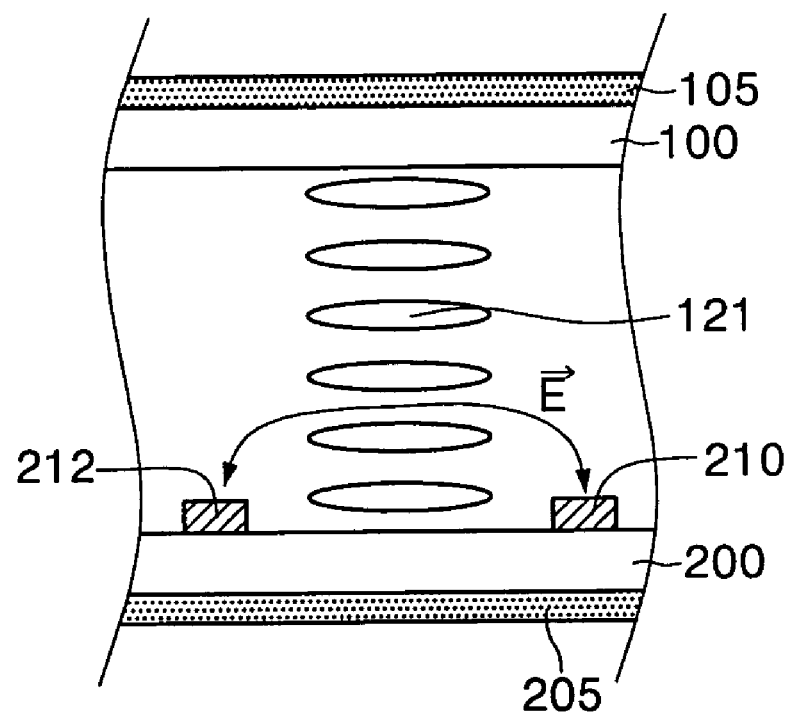
Figure 3B:
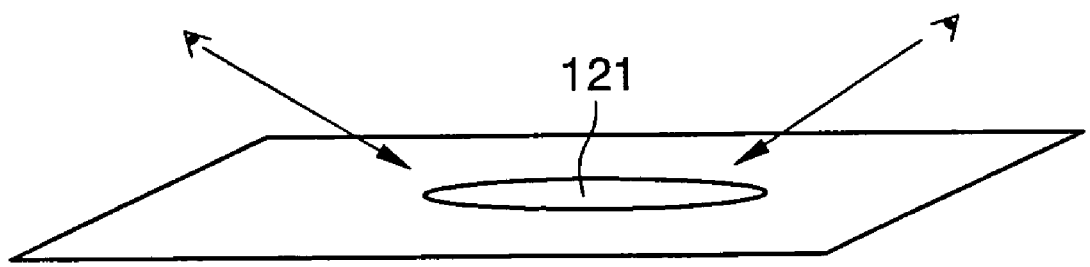

FIGS. 3A and 3B are cross-sectional views of the turned-on and turned-off states of an IPS-mode LCD.

FIG. 3A illustrates the IPS-mode LCD in a turned-off state. That is, no electric field is applied between a pixel electrode 212 and a common electrode 210. Liquid crystals 121 are disposed between an encapsulation substrate 100 and a substrate 200, on which polarizers 105 and 205 are respectively disposed. The liquid crystals 121, to which no electric field is applied, are arranged parallel to the substrate 200.

FIG. 3B illustrates the IPS-mode LCD in a turned-on state due to an electric field between the pixel electrode 212 and the common electrode 210. As shown in FIG. 3B, when a voltage is supplied to the liquid crystals 121, the liquid crystals 121 rotate parallel to the substrate 200. That is, when the voltage is supplied to the liquid crystals 121, the liquid crystals 121 rotate within the range of a surface parallel to the substrate 200 so that the LCD is turned on.

Accordingly, when the LCD is turned on, the structure as described above with reference to FIGS. 1 and 2 (i.e., the structure including the conductive layer 150, the anisotropic conductive material 400, and the bezel 300 that are disposed on the substrate 200) allows static electricity to be discharged so that the liquid crystals can be driven by the lateral electric field irrespective of the static electricity.

A method of fabricating an FPD according to the exemplary embodiment of the present invention is described below with reference to FIGS. 1 and 2.

To begin with, a display device 120 is formed on a substrate 200. The display device 120 can be an LCD, which can be formed using IPS-mode liquid crystals.

More specifically, a conductive layer is deposited on the substrate 200 and then patterned, thereby forming a gate electrode, a gate pad, and a common electrode. A gate insulating layer is deposited on the resultant structure, and a semiconductor layer is formed thereon. Next, interconnection layers including a source electrode and a drain electrode are formed on the semiconductor layer.

Thereafter, an encapsulation substrate 100 including color filters and black matrixes is prepared and assembled with the substrate 200, and liquid crystals are injected between the encapsulation substrate 100 and the substrate 200. After the injection of the liquid crystals, the substrate 200 and the encapsulation substrate 100 are encapsulated using a sealant 110, and a conductive layer 150 is formed on the encapsulation substrate 100.

The conductive layer 150 can be formed on the outside of the encapsulation substrate 100 before the encapsulation substrate 100 is assembled with the substrate 200. The conductive layer 150 can be formed of a transparent conductive material that can transmit light emitted from the display device 120. Furthermore, the conductive layer 150 can be formed of a material selected from the group consisting of ITO, IZO, IO, TO, and ZnO.

An anisotropic conductive material 400 is formed on the conductive layer 150. The anisotropic conductive material 400 can be formed in a non-emission region. The anisotropic conductive material 400 is comprised of an insulating material 420 and a conductive material 410. The insulating material 420 surrounds the outside of the anisotropic conductive material 400, and the conductive material 410 is disposed inside the insulating material 420 and is electrically connected to the upper and lower layers. Also, the anisotropic conductive material 400 can have a zebra structure.

The substrate 200, which is assembled with the encapsulation substrate 100, is mounted on a bezel 300 such that it contacts the anisotropic conductive material 400. The bezel 300 can be formed of a conductive material. Also, a conductive layer can be patterned in a portion of the bezel 300, which contacts the anisotropic conductive material 400, and the patterned conductive layer can be connected to the external.

Accordingly, static electricity generated in the FPD moves along the conductive layer 150 to the anisotropic conductive material 400. Then, the static electricity in the anisotropic conductive material 400 is externally grounded through the bezel 300. Thus, the static electricity generated in the FPD does not affect the display device 120 and goes out of the FPD so that pixels of the display device 120 can be securely protected.

In addition, during the formation of the display device 120, the ground terminal 230a of the pad portion 230 can be formed at the same time. Furthermore, the ground terminal 230a of the pad portion 230 can be connected to the bezel 300 by the anisotropic conductive material 400.

As a result, static electricity generated in the FPD does not affect circuits of the FPD and can be discharged from the FPD without using any external member such as an FPC, with the result that the display device 120 can be reliably protected from the static electricity.

In the exemplary embodiments of the present invention as described above, a structure for discharging static electricity is disposed outside an FPD, so that a display device in the FPD can be protected from the static electricity.

Also, a structure for preventing static electricity is disposed on the outside of an IPS-mode LCD that is driven by a lateral electric field. Thus, a driving circuit of the LCD can be protected and the destruction of liquid crystals due to the static electricity can be reduced.

Although the present invention has been described with reference to certain exemplary embodiments thereof, it will be understood by those skilled in the art that a variety of modifications and variations can be made to the present invention without departing from the spirit or scope of the present invention as defined in the appended claims.

What is claimed is:

1. A Flat Panel Display (FPD) comprising:
   a display device arranged on a substrate;
   an encapsulation substrate adapted to encapsulate the display device;
   a conductive layer arranged on an outside surface of the encapsulation substrate;
   an anisotropic conductive material arranged on the conductive layer; and
   a bezel arranged in contact with the anisotropic conductive material,
   wherein the anisotropic conductive material comprises a zebra structure of a conductive material surrounded on opposite sides by a nonconductive material,
   wherein the anisotropic conductive material is arranged only in a non-emission region.

2. The FPD according to claim 1, wherein the conductive layer comprises a transparent conductive layer.

3. The FPD according to claim 1, wherein the conductive layer comprises a material selected from a group consisting of Indium Tin Oxide (ITO), Indium Zinc Oxide (IZO), Indium Oxide (IO), Tin Oxide (TO), and Zinc Oxide (ZO).

4. The FPD according to claim 1, wherein the bezel comprises a conductive material.

5. The FPD according to claim 1, further comprising a pad ground terminal arranged on the substrate.

6. The FPD according to claim 5, wherein the pad ground terminal is adapted to be connected to the bezel.

7. The FPD according to claim 1, wherein the display device comprises a Liquid Crystal Display (LCD).

8. The FPD according to claim 7, wherein the liquid crystal display comprises an In-Plan-Switch (IPS)-mode LCD.

9. A method of fabricating a Flat Panel Display (FPD), the method comprising:
   forming a display device on a substrate;
   encapsulating the substrate with an encapsulation substrate;
   forming a conductive layer on an outside surface of the encapsulation substrate;
   forming an anisotropic conductive material on the conductive layer; and
   mounting the substrate on a bezel such that the bezel contacts the anisotropic conductive material,
   wherein the anisotropic conductive material comprises a zebra structure of a conductive material surrounded on opposite sides by a nonconductive material,
   wherein the anisotropic conductive material is formed only in a non-emission region.

10. The method according to claim 9, wherein the conductive layer comprises a transparent conductive material.

11. The method according to claim 9, wherein the conductive layer comprises a material selected from a group consisting of Indium Tin Oxide (ITO), Indium Zinc Oxide (IZO), Indium Oxide (IO), Tin Oxide (TO), and Zinc Oxide (ZO).

12. The method according to claim 9, wherein the bezel comprises a conductive material.

13. The method according to claim 9, further comprising forming a pad ground terminal on the substrate.

14. The method according to claim 13, wherein the pad ground terminal is adapted to be connected to the bezel.

15. The method according to claim 9, wherein the display device comprises a Liquid Crystal Display (LCD).

16. The method according to claim 15, wherein the LCD comprises an In-Plan-Switch (IPS)-mode LCD.

* * * * *